UNITED STATES PATENT OFFICE.

MARY JANE PULTE, OF CINCINNATI, OHIO.

IMPROVED COMPOSITION FOR CLEANING GLOVES.

Specification forming part of Letters Patent No. 35,706, dated June 24, 1862.

*To all whom it may concern:*

Be it known that I, MARY JANE PULTE, of Cincinnati, in the county of Hamilton and State of Ohio, have invented or discovered a new and Improved Compound or Composition for Cleaning Kid Gloves; and I do hereby declare the following to be a full, clear, and exact description of the ingredients and mode of compounding the same.

The compound or composition which I have invented or discovered is of the nature of a paste, and the ingredients and mode of combining the same are as follows: Take one pound of hard soap. (For the purpose I prefer the kind known in the markets as the "Oleine Soap;" but as a substitute therefor the white castile, or any other pure soap, provided the same contains no coloring-matter or rosin, may be used.) Cut it into small pieces and place it with one-half a pint of clear soft water in an iron pot. Allow it to stand ten or twelve hours in a warm place, after which boil the compound until the soap is perfectly reduced and the compound rendered quite smooth. Then pour the contents of the pot into a wooden bowl, and while still warm add one and one-fourth of an ounce of commercial alcohol, stirring and mixing the whole together thoroughly. Then add slowly and gradually four ounces of clear soft water, beating the compound violently while the water is being added, and continuing to beat it until the mass becomes perfectly homeogeneous in appearance, and very white and light. The preparation of this paste should be attended to with care, as the separate effect of either of the active ingredients would in some instances be injurious, particularly where the paste is used upon gloves of some of the delicate colors; but when thoroughly combined in the manner I have described the paste or detergent may be used upon gloves of the most delicate and sensitive tints without affecting the color to any appreciable extent.

My mode of applying the paste in cleaning gloves is as follows: I insert a round smooth pin of an appropriate size into the fingers of the glove, so as to render the kid smooth and even, and then apply the paste in minute quantities with a soft, clean white woolen cloth, rubbing the part to which the paste is applied with the cloth until it is quite clean.

Having now fully described my invention, what I claim, and desire to secure by Letters Patent, is—

The within-described composition of matter for cleaning kid gloves, combined in the proportions and in the manner substantially as set forth.

In testimony whereof I have hereunto set my hand.

MARY J. PULTE.

Witnesses:
MINA ZIMMERMANN,
T. A. NESMITH.